US008949721B2

(12) United States Patent
Bakalov et al.

(10) Patent No.: US 8,949,721 B2
(45) Date of Patent: Feb. 3, 2015

(54) PERSONALIZATION OF WEB CONTENT

(75) Inventors: Fedor Bakalov, Weimar (DE); Birgitta Koenig-Ries, Karlsruhe (DE); Andreas Nauerz, Stuttgart (DE); Martin Welsch, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 13/350,230

(22) Filed: Jan. 13, 2012

(65) Prior Publication Data

US 2012/0192082 A1 Jul. 26, 2012

(30) Foreign Application Priority Data

Jan. 25, 2011 (EP) .................................... 11151999

(51) Int. Cl.
*G06F 3/00* (2006.01)
*G06F 17/30* (2006.01)

(52) U.S. Cl.
CPC ................................ *G06F 17/30873* (2013.01)
USPC ........... 715/742; 715/234; 715/790; 709/219; 709/217

(58) Field of Classification Search
USPC .......... 715/747, 234, 742, 760; 709/256, 217, 709/219
See application file for complete search history.

(56) References Cited

U.S. PATENT DOCUMENTS

| | | | | |
|---|---|---|---|---|
| 6,493,688 B1 * | 12/2002 | Das et al. ........................ | 706/20 |
| 6,539,375 B2 | 3/2003 | Kawasaki | |
| 7,146,563 B2 * | 12/2006 | Hesmer et al. ................ | 715/223 |
| 7,349,949 B1 | 3/2008 | Connor et al. | |
| 7,475,354 B2 * | 1/2009 | Guido et al. .................. | 715/742 |
| 7,493,564 B2 * | 2/2009 | Swanson et al. .............. | 715/738 |
| 7,500,181 B2 * | 3/2009 | Kim et al. ..................... | 715/234 |
| 7,536,637 B1 * | 5/2009 | Nauerz et al. ................ | 715/230 |
| 7,607,092 B2 * | 10/2009 | Rogers et al. ................ | 715/734 |
| 7,676,557 B1 * | 3/2010 | Behl et al. .................... | 709/220 |
| 7,793,215 B2 * | 9/2010 | Cohen .......................... | 715/249 |
| 7,865,869 B2 * | 1/2011 | Kurz et al. ................... | 717/104 |
| 7,890,885 B2 * | 2/2011 | Muller et al. ................ | 715/808 |
| 7,937,670 B2 * | 5/2011 | Arthurs et al. ............... | 715/804 |
| 7,996,757 B2 * | 8/2011 | Hind et al. ................... | 715/205 |
| 8,037,409 B2 * | 10/2011 | Jacob et al. .................. | 715/243 |
| 8,156,441 B1 * | 4/2012 | Bihari et al. ................. | 715/748 |
| 8,190,486 B1 * | 5/2012 | Ouimet ....................... | 705/26.1 |
| 8,191,002 B2 * | 5/2012 | Lauridsen et al. ........... | 715/760 |
| 8,214,753 B2 * | 7/2012 | Aryanto et al. .............. | 715/762 |

(Continued)

OTHER PUBLICATIONS igoogle (2008).*

(Continued)

*Primary Examiner* — Doon Chow
*Assistant Examiner* — David Choi
(74) *Attorney, Agent, or Firm* — Marcia L. Doubet (57) ABSTRACT

Personalization of web content is provided, comprising: accessing web content, selecting components of the web content in accordance with a user model, and structuring the components of the web content in accordance with the user model. The personalization further comprises presenting the components of the web content in accordance with the user model, and providing a graphical user interface for adapting the user model, wherein the graphical user interface is provided together with the web content of a portlet of a web portal, such that each adaptation of the user model is updated in real-time in the currently presented web content in the portlet.

15 Claims, 6 Drawing Sheets

(56) References Cited

U.S. PATENT DOCUMENTS

| | | | |
|---|---|---|---|
| 8,701,025 B2 | 4/2014 | Bakalov et al. | |
| 2002/0085031 A1 | 7/2002 | Conrado et al. | |
| 2003/0218611 A1 | 11/2003 | Ben-Tovim et al. | |
| 2004/0070624 A1 | 4/2004 | Fushimi et al. | |
| 2005/0010634 A1* | 1/2005 | Henderson et al. | 709/201 |
| 2005/0093866 A1 | 5/2005 | Ebert | |
| 2005/0119910 A1* | 6/2005 | Schneider | 705/1 |
| 2005/0119913 A1* | 6/2005 | Hornreich et al. | 705/2 |
| 2006/0047777 A1 | 3/2006 | Harris et al. | |
| 2006/0170793 A1* | 8/2006 | Pasquarette et al. | 348/240.99 |
| 2007/0156435 A1 | 7/2007 | Greening et al. | |
| 2008/0040681 A1* | 2/2008 | Synstelien et al. | 715/765 |
| 2008/0162499 A1* | 7/2008 | Connor et al. | 707/10 |
| 2008/0195971 A1* | 8/2008 | Jung et al. | 715/810 |
| 2008/0209349 A1 | 8/2008 | Macadaan et al. | |
| 2009/0006586 A1* | 1/2009 | Kurz et al. | 709/220 |
| 2009/0064004 A1 | 3/2009 | Chakra et al. | |
| 2009/0070101 A1 | 3/2009 | Masuyama et al. | |
| 2009/0187551 A1 | 7/2009 | Lam et al. | |
| 2009/0199124 A1* | 8/2009 | Birch | 715/772 |
| 2009/0249251 A1* | 10/2009 | Eischeid et al. | 715/810 |
| 2009/0287989 A1 | 11/2009 | Chakra et al. | |
| 2009/0288021 A1* | 11/2009 | Ioffe et al. | 715/760 |
| 2010/0011320 A1* | 1/2010 | Shah et al. | 715/811 |
| 2010/0023874 A1* | 1/2010 | Frohwein | 715/747 |
| 2010/0036933 A1* | 2/2010 | Breau et al. | 709/218 |
| 2010/0064233 A1* | 3/2010 | Dewar et al. | 715/760 |
| 2010/0115432 A1* | 5/2010 | Arthurs et al. | 715/760 |
| 2010/0121707 A1 | 5/2010 | Goeldi | |
| 2010/0153865 A1* | 6/2010 | Barnes et al. | 715/762 |
| 2010/0185933 A1* | 7/2010 | Coffman et al. | 715/230 |
| 2010/0205541 A1 | 8/2010 | Rapaport et al. | |
| 2010/0218124 A1* | 8/2010 | Aryanto et al. | 715/762 |
| 2010/0251120 A1* | 9/2010 | Chelba | 715/719 |
| 2010/0299615 A1* | 11/2010 | Miluzzo et al. | 715/752 |
| 2011/0173553 A1 | 7/2011 | Karmon et al. | |
| 2011/0289437 A1* | 11/2011 | Yuen et al. | 715/762 |
| 2011/0307813 A1* | 12/2011 | Bakalov et al. | 715/763 |
| 2012/0054609 A1* | 3/2012 | Sher Sever et al. | 715/709 |
| 2012/0102408 A1* | 4/2012 | Zhao et al. | 715/738 |
| 2012/0192082 A1* | 7/2012 | Bakalov et al. | 715/747 |
| 2012/0221942 A1* | 8/2012 | Sah et al. | 715/234 |
| 2012/0260192 A1* | 10/2012 | Detweiler | 715/745 |

OTHER PUBLICATIONS

Murakami, et al., "A System for Generating User's Chronological Interest Space from Web Browsing History", International Journal of Knowledge-based and Intelligent Engineering Systems, vol. 8, Issue 3 (Aug. 2004), pp. 149-160. Published 2004, IOS Press, ISSN: 1327-2314.

Keim et al., "Monitoring Network Traffic with Radial Traffic Analyzer", IEEE 2006 Oct. 31-Nov 2.

Draper, G & Riesenfeld, R., "Interactive Fan Charts: A Space-saving Technique for Genealogical Graph Exploration", 2008, Brigham Young University.

Brandes, et al., "Visone: Analysis and Visualization of Social Networks", Mathematics and Visualization 2004, pp. 321-340.

Feder Bakalov et al., U.S. Appl. No. 13/106,294, filed May 12, 0211, Office Action, Apr. 11, 2013, 15 pages.

Feder Bakalov et al., U.S. Appl. No. 13/106,294, filed May 12, 0211, Office Action, Sep. 3, 2013, 11 pages.

* cited by examiner

PERSONALIZATION OF WEB CONTENT

BACKGROUND

The invention relates generally to personalization of web content, as well as to a content personalization engine.

Web portals, or simply portals, pioneered as one of the earliest adopters of adaptation and personalization techniques to help users deal with the problem of information overload. Nowadays, a large number of organizations use them as a single point of access to the vast amount of resources available on the Web and in enterprise intranets. Some organizations strive to make portals adaptive to the users and the context they work in, so that the users may be provided with the right information at the right time. There may be different kinds of adaptation effects the users might encounter in an adaptive portal, e.g., the portal's front page displaying recently added resources comprising the information that a user is interested in, modifying navigation topology to promote interesting pages to better positions, augmenting portal content with additional information that may match a user's current interests, and so on.

In order to achieve such adaptation effects, the following four requirements may be met. First, the portal may comprise a user model containing information about users, e.g., their interests, expertise, traits, goals, and so on. Secondly, the portal's resources may be described with metadata representing machine-processable semantics of the content. Thirdly, to achieve automatic selection of the resources that may match a user's individual needs, both user model and metadata may use the same vocabulary, which may require a domain knowledge model represented in a formalism that may be interpreted by the portal. Fourthly, the portal may need personalization rules governing what adaptation effects should be made for a certain user, when, and how.

In today's adaptive portals, users may see only the final adaptation effects. The mechanism of the adaptation process, user and domain knowledge models, and personalization rules are hidden from the user. This, however, results in a number of grave usability and privacy problems and may cause incompleteness and incorrectness of the system information being used for the adaptation. Firstly, users do not understand how the personalization works, e.g., why they get recommendations to certain resources. Secondly, users may have a very limited control on personalization, which may lead to wrong personalization effects. For instance, if the user cannot view and modify data of his own user model, she or he may not be able to notice and correct wrong assumptions that the system may make about her or his interests. This may result in receiving recommendations to irrelevant content and/or not recommending relevant content.

Several approaches have been followed in order to deal with a portal personalization. Document U.S. Pat. No. 7,349, 949B1 discloses systems and methods for facilitating development of a customizable portlet. The disclosure comprises receiving requested content information, merging presentation information with the requested content information to form merged information, and rendering the merged information in the customizable portlet. The methods require a master builder.

Document US2009/0064004B2 discloses a method for configuring portlets. In one embodiment, a method of automatically configuring a portlet is provided. The method includes: receiving a portlet; searching content of the portlet for a contextual aspect; and automatically applying attribute information to a portlet window object based on a discovered contextual aspect.

Document US2006/0047777A1 discloses a method, system, and apparatus for enhancing the run-time display of a portlet using dynamically applied portlet skins. The system can include a portlet aggregator configured to aggregate portlet views into a portal page, and alternate skin insertion logic programmed to wrap at least one portlet view with an alternate skin in lieu of a static skin. A portlet filter can be communicatively coupled to the portlet aggregator and configured to manage the alternate skin insertion logic.

However, because of the limitations of the technology of the state of the art, there may be a requirement for an improved mechanism for interacting with portals, in particular a way to better control functionality of portlets in a portal.

BRIEF SUMMARY

According to one embodiment, a method for personalization of web content may be provided. The method may comprise accessing web content, selecting components of the web content in accordance with a user model, structuring the components of the web content in accordance with the user model, presenting the components of the web content in accordance with the user model, and providing a graphical user interface for adapting the user model, wherein the graphical user interface may be provided, in particular presented together with the web content of a portlet of a web portal, such that each adaption of the user model may be updated in real-time in the currently presented web content in the portlet. In particular, a user may directly recognize effects of changes on the web content and its representation.

In another embodiment, a web content personalization engine for a personalization of web content may be provided. The web content personalization engine may comprise an accessing unit adapted for accessing web content, a selecting unit adapted for selecting components of the web content in accordance with a user model, a structuring unit adapted for structuring the web content in accordance with a user model, a presenting unit adapted for presenting the components of the web content in accordance with the user model, and a providing unit adapted for providing a graphical user interface for adapting the user model, wherein the graphical user interface may be provided, in particular presented together with the web content of a portlet of a web portal, such that each adaption of the user model may be updated in real-time in the currently presented web content in the portlet.

BRIEF DESCRIPTION OF THE SEVERAL VIEWS OF THE DRAWINGS

Preferred embodiments of the invention will be described, by way of example only, with reference to the following drawings:

FIGS. 5$a$ to 5$c$ illustrate a preference setting for user interests.

DETAILED DESCRIPTION

It may be noted that the accessed web content may originate from information sources on the Internet as well as from an Intranet and may be accessed by hyperlinks. The web content may also originate from a web application in which output fields as well as input fields may be made available to a user in a portlet of a portal system.

It may also be noted that the effect of the real-time update and thus, an immediate visibility, may also be achieved by hovering a pointing device over an option.

In the context of this application, the following terms are used:

Personalization—The term personalization may denote individual adaptations of general settings in a computer system. Web pages may be personalized based on individual characteristics (interests, social category, context, etc.) of an individual. Personalization may imply that the changes may be based on implicit data, such as items purchased or pages viewed. The term personalization may be differentiated from the term customization. Customization may typically represent an adaptation to a larger group of individuals and may involve special programming knowledge of a programmer.

Web content—The term web content may denote any information from any source on the Internet or an intranet. It may have the form of text, graphics, audio, video, or any other form of visual or audio content. The web content may be accessible via hyperlinks or from file servers. In the context of this application, a web application may also count as web content. A portal or a portlet of a portal may be used for an interaction with a user using input and/or output fields of a web application. Typically, a pointing device may be used for the interaction.

Web portal—The term web portal may denote a unified access point, often in the form of a web-based user interface, and may be designed to aggregate and personalize information through application-specific portlets. A web portal may aggregate information available on the Internet or from an intranet. It may be a tool that helps a company manage its data, applications, and information more easily, and through personalized views. Private users may also access private or publicly available content over the Internet using a portal with portlets. A web portal may be adapted to integrate legacy applications or other portal objects, and may handle thousands of user requests.

Portlet—The term portlet may denote a pluggable user interface software component that may be managed and displayed in a web portal. Portlets may produce fragments of markup code that may be aggregated into a portal. Typically, following the desktop metaphor, a portal page may be displayed as a collection of non-overlapping or overlapping portlet windows, wherein each portlet window may display a portlet. Hence, a portlet (or collection of portlets) may resemble a web-based application that may be hosted in a portal or on a server. Some examples of portlet applications may be e-mail, weather reports, stock prices, discussion forums, news, and so on.

User model—The term user model may denote a data structure comprising information about users, e.g., interests, expertise, items purchased, traits, goals, and so on. The user model may abstract the user data using a meta data model. Such a meta data model may be related to one or more domain knowledge models for an easy information relationship between a user model and an item history log (obtained, for example, through clicked links).

The above-described approach to personalization of web content may provide a couple of advantages. In particular, it may improve the way a user may interact with a portal. The user may recognize effects of his/her interaction with a user interface for adaption and/or personalization of portal elements such as portlets. It may no longer be required to restart a portal session or restart an application before personalization features come into effect. The user may now see immediate effects of his/her personalization options and may, in a trial-and-error manner, optimize personalization settings in a user model. This advantage may materialize if a user actively selects a personalization option out of a menu of options. But it may also be achieved if a user just hovers over certain option settings, even without explicitly selecting this option with a pointing device, e.g., a mouse. A real selection may then be achieved by an actual click (i.e., as contrasted to a hover) in the selection option.

The disclosed approach may also provide a more transparent interaction of the personalized portal with a user, and it may allow—besides a higher granularity of personalization options—a better control of privacy aspects. With such a method and interface, the user may see which parts of the portal pages may be personalized and what kind of information from the user model may have been used for it. The method not only improves the interaction with the portal, but may also ensure transparency, allowing the user to control how his/her private data may be used.

One embodiment may also comprise providing a control button for the portlet for selectively enabling or disabling a personalization. This may allow a user to move back to default values for personalization settings for a portal. Personalization preferences may also vary over time. If a user has not used a specific portlet for a certain time, he may not like his former personalization settings any longer. The feature, mentioned above, may let the user easily turn back to previous portlet settings.

Another embodiment may comprise providing a control button for the portlet for an activation of an interaction window for the adaption of the user model. This option may allow displaying data of a currently selected user model comprising the user data for the personalization effects. The control button may be implemented as an additional control button on a bar of a typical portlet frame. In many cases, this frame bar may be implemented on top of the frame of the portlet. However, it may also appear on any side of the portlet frame: left, right, or on the bottom. It may also appear by hovering over a certain area of the portlet frame.

Configuring Personalization: In addition to turning personalization on and off, the user may obtain the information by explaining how, and in accordance with what data, the portlet's content may have been personalized. Also, the user may alter personalization options and immediately see the effects of the changes on the portlet's content. By clicking, e.g., a "Display Personalization Options" button, the portlet may display a text message conveying the information about the part of the user model that may have been used for personalization (e.g., user interest profile in politics) and the adaptation effects that may have taken place (e.g., sorting news according to user interests). Also, the portlet may display the content of the currently selected interest profile containing the user's individual interests that have been used for personalizing the portlet.

In a preferred embodiment, the adaptation of the user model may be based on selecting an interest profile from the user model. As part of the user interface for a personalization of a portlet, different user profiles may be selected having different personalization settings. Different user interest may be, e.g., a politics profile, a sports profile, a hobby profile, etc. A user may select the different user profiles by clicking on, e.g., a hyperlink in the user interface of a portlet personalization. This may allow a very fine-grained personalization depending, e.g., on different interest profiles for topics. For example, a map in a portlet may have a different personalization because other user model data may be used if compared to a personalization of a travel information portal.

In yet another embodiment, an interest in the interest profile may be represented by a keyword. More interests may be displayed in the form of more keywords. The interest may also be displayed with special displaying effects like, e.g., a specific color scheme, font, positioning, grouping, etc. This way, individual personalization options may be recognizable immediately by a user. If a user changes an interest using the user interface for personalization of a portlet, he/she may immediately see the effect of the changed interest. Some keywords may disappear on the screen or completely disappear from one profile, while it may be highlighted on the screen as part of another interest profile. Positioning of the keywords within a portlet may be another personalization feature for a portlet. A user may select individually preferred positions of user interests relating to a specific interest profile within the portlet.

In one embodiment, the adaptation of the user model may comprise moving the keyword over a colored area of the graphical user interface. If a user has selected the user interface for an adaption of his/her personalization options, the options may be presented of clickable options. If a user clicks (e.g., using a pointing device) on a personalization option of the related portlet, which may still be visible, he/she may directly and immediately see the effect. For this, it may be advantageous if the user interface for a personalization of a portlet may not overlap with the interface window that may be required for an adaptation of the user model.

It should be noted that embodiments may take the form of an entirely hardware implementation, an entirely software embodiment, or an embodiment containing both hardware and software elements. In a preferred embodiment, the invention may be implemented in software which includes, but is not limited to, firmware, resident software, and microcode.

In one embodiment, a data processing program for execution in a data processing system may be provided comprising software code portions for performing a method, as described herein, when the program may be run on a data processing system. The data processing system may be a computer or computer system.

Furthermore, embodiments may take the form of a computer program product which is accessible from a computer-usable or computer-readable medium providing program code for use by or in connection with a computer or any instruction execution system. For the purpose of this description, a computer-usable or computer-readable medium may be any apparatus that may store, communicate, propagate, or transport the program for use by or in a connection with the instruction execution system, apparatus, or device.

The medium may be an electronic, magnetic, optical, electromagnetic, infrared, or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), DVD, and Blu-Ray Disk.

It should also be noted that embodiments of the invention have been described with reference to different subject matters. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject matter, also any combination between features relating to different subject matters, in particular between features of the method type claims, and features of the apparatus type claims, is considered as to be disclosed within this document.

The aspects defined above and further aspects of the present invention are apparent from the examples of embodiments described herein and are explained with reference to examples of embodiments, which are illustrative but not limiting.

A detailed description of the drawings will now be given. All illustrations in the drawings may be schematic. Firstly, a block diagram of a method for personalization of web content will be described. Afterwards, several system components and related elements will be described.

Figure 1:
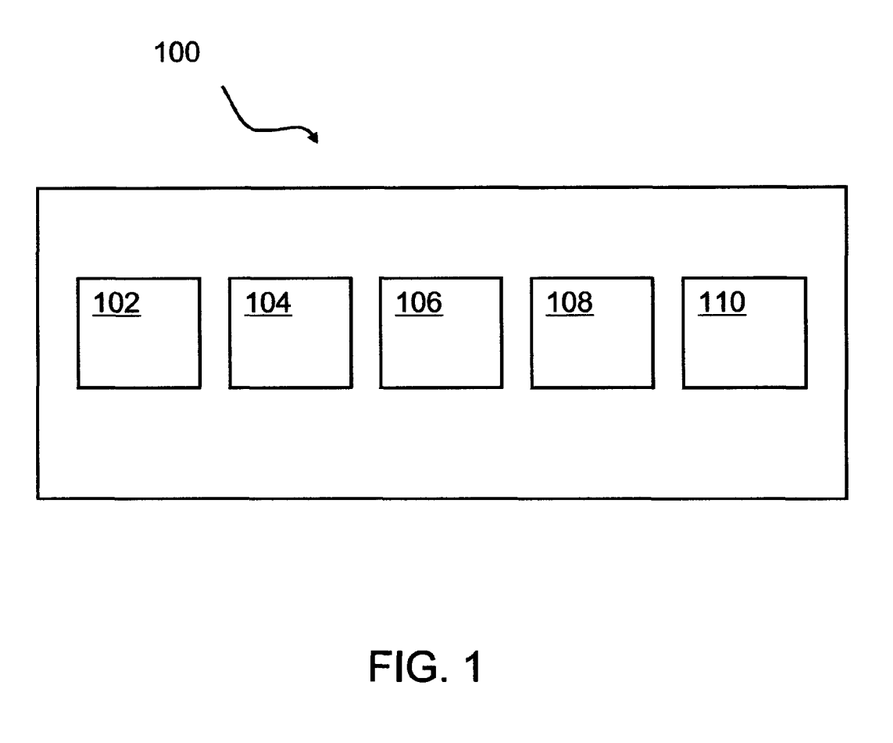
FIG. 1 shows a block diagram of an embodiment of an inventive method for personalization of web content.

FIG. 1 shows a block diagram of an embodiment of an inventive method for personalization of web content. The method 100 for personalization of web content may comprise accessing 102 web content, selecting 104 components of the web content in accordance with a user model, structuring 106 the components of the web content in accordance with the user model, and presenting 108 the components of the web content in accordance with the user model. Furthermore, the method may comprise providing 110 a graphical user interface for adapting the user model, wherein the graphical user interface may be provided, in particular presented together with the web content of a portlet of a web portal, such that each adaptation of the user model may be updated in real-time in the currently presented web content in the portlet.

Figure 2:
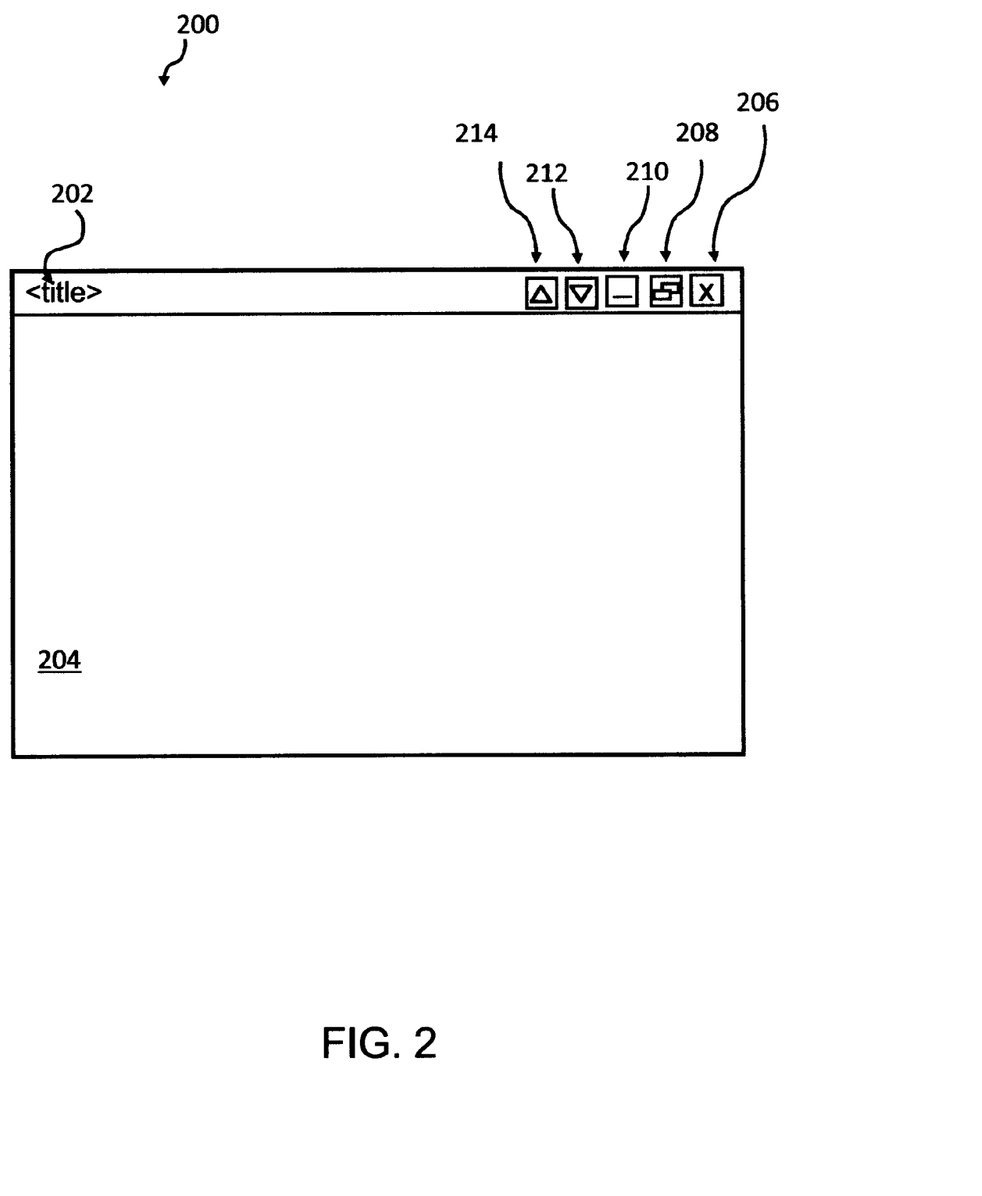
FIG. 2 shows an embodiment of a layout of selection buttons for a portlet.

FIG. 2 shows an embodiment of a layout of selection buttons for a portlet. The illustrated portlet frame or portlet window may be one of more portlets within a portal. The portlet 200 may have a title bar 202 showing a title of the portlet. In the portlet area 204, web content of any kind may be displayed, as known by a skilled person. The portlet may also comprise typical selection buttons 206, 208, 210. Button 206 may be used for closing the portlet 200, button 208 may be used for resizing the portlet 200, and button 210 may be used for minimizing the portlet 200, as known by a skilled person. Additionally, two more buttons may be shown, as illustrated by buttons 210 and 212. They may be selectable by a pointing device. Soft-button 212 may be used for displaying or hiding another frame or window showing personalization options. A first click on button 212 may open the personalization option window in a pull-down or pop-up menu fashion. A second click—if the personalization option window has been opened before—may close the personalization window.

The additional soft-button 214 may be used to toggle between an activated personalization and a deactivated status of the personalization. It may also be possible to change from one user profile to another in a round-robin manner if more than one interest profile has been established in the underlying user model.

Figure 3:
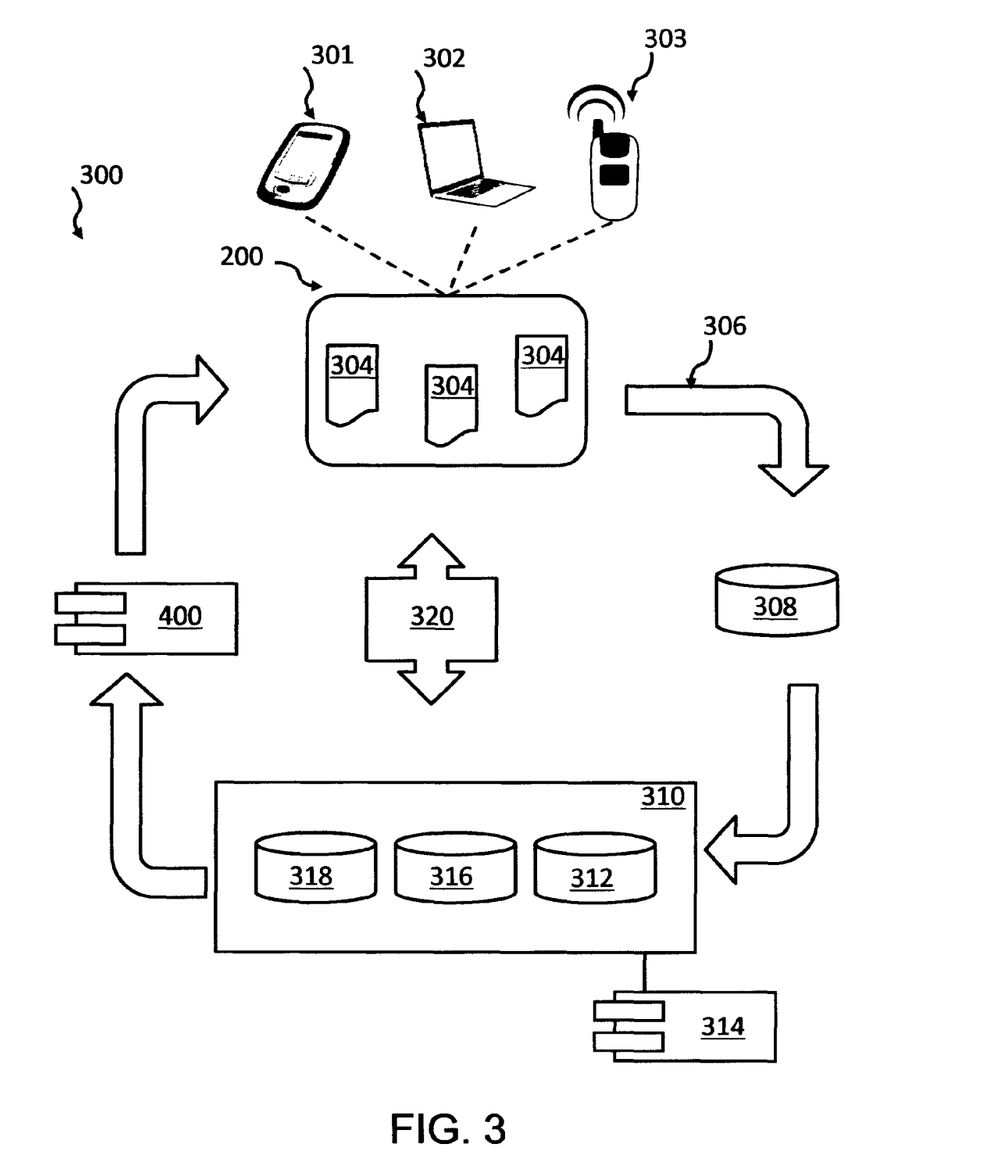
FIG. 3 illustrates an embodiment of a user model in a personalization cycle.

FIG. 3 illustrates an embodiment of a user model in a personalization cycle 300. The user model may be used for presenting web content on any device 302, may it be a classical computer screen, a smart phone 301, a notebook computer 302, or any other computing device 303 with a screen and a user interface adapted to work with a browser and/or portal using portlets 200 in which web content 304 may be displayed.

The process of creation and usage of user models in web portals may involve the following steps:

Collecting a user browsing history, 306: A user browsing history may be the major source for an identification of user interests. It may be stored in the user browsing log 308 and may be represented as a table containing IDs (IDentification numbers), e.g., URLs (universal resource locators), of the portal resources accessed by the user. The resource IDs may be collected by the portal through monitoring the user activity on the portal pages and recording the IDs of all the resources that the user requests.

Extracting named entities: From the content of every resource recorded in the browsing log 308, a user modeling server 310 may extract named entities leveraging external tools 314 for natural language processing (NLP). Among others, the server 310 may extract entities of such types as person, country, company, technology, product, etc. For example, from the string "Bill Gates lives in California and is working for Microsoft" the server may extract "Bill Gates" as person, "California" as state, and "Microsoft" as company.

The extracted entities, called terms, are recorded in the terms log 312. The terms log 312 may contain information about the occurrences of terms in the portal or portlet pages that the user may have accessed, e.g., which terms and how often the user may have encountered a term in the content of requested pages.

Identifying frequent terms: For every term stored in the terms log 312, the user modeling server 310 may periodically calculate a term frequency value using the formula below, which may be a fraction of a number of occurrences of term $t_i$ for user$_j$ and the total number of occurrences of all terms registered for user$_j$. The term frequency value $TF_{i,j}$ may then be leveraged to identify an interest degree. A high term frequency may denote a high degree of interest for the user, $$TF_{i,j} = \frac{t_{i,j}}{\sum_k t_{k,j}}.$$

To compensate the sparsity of user interests derived from the browsing history, the user modeling server 310 may also perform a reasoning leveraging the domain knowledge model 318 (represented as an ontology). This may happen when the portal identifies new interests by propagating interest from the terms for which the user model 316 may already contain information (e.g., the user has explicitly specified interest degree, or it may have been determined by the portal based on the term frequency). For instance, if the user model 316 contains a user interest in "Berlin" and in the domain model 318 "Germany" is connected to "Berlin" through the property "hasCapital", then the server 310 may propagate the user interest from the former to the latter. Reference numeral 320 may denote the user interface for adapting the user model. It may allow users to get access to their user model data.

Providing the user access to the user model: In order to ensure transparency of the personalization process in the portal and to guarantee completeness and correctness of information in the user model 316, the user may be provided with access to his/her user model 316 through a visual interface. The user may be enabled to view the terms that the portal may have collected into the user model 316 and an interest degree that the portal may believe the user may have in those terms. In addition to viewing this information, the user may also alter it. The user may modify interest degrees in any of the existing terms or delete them, and may add new terms.

Leveraging user model for personalization: Finally, the portal's personalization engine 400 may leverage the information about individual user interests represented in the user model 316 for achieving various types of adaptation effects. Information about a user's interest may be used for recommending portal documents containing information relevant to the user's interest, for automatic reordering of documents (such as displaying relevant pages first), for personalizing search results, and so on.

Figure 4:
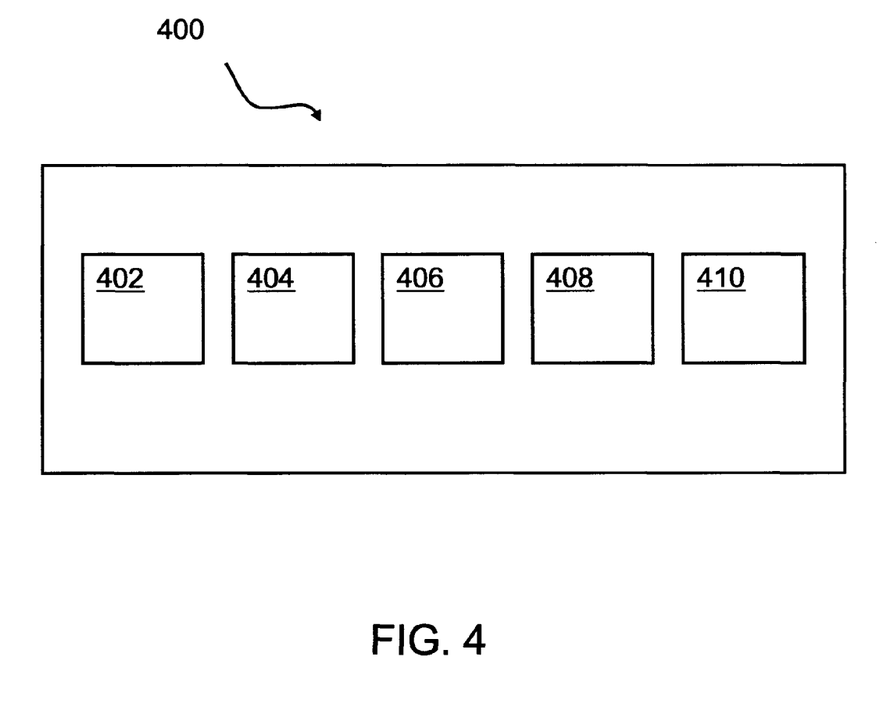
FIG. 4 illustrates an embodiment of a web content personalization engine.

FIG. 4 illustrates an embodiment of a web content personalization engine 400 for a personalization of web content of portlets. This may comprise an accessing unit 402 adapted for accessing web content, a selecting unit 404 adapted for selecting components of the web content in accordance with a user model, a structuring unit 406 adapted for structuring the components of the web content in accordance with the user model, a presenting unit 408 adapted for presenting the components of the web content in accordance with the user model, and a providing unit 410. The providing unit 410 may be adapted for providing a graphical user interface for adapting the user model, wherein the graphical user interface may be provided, in particular presented together with the web content of a portlet of a web portal such that each adaption of the user model may be updated in real-time in the currently presented web content in the portlet. This may be achieved by hovering over a selection option without explicitly clicking onto it using, e.g., a pointing device. This way, a user may get an impression of the result before actually having made a selection.

Figure 5A:
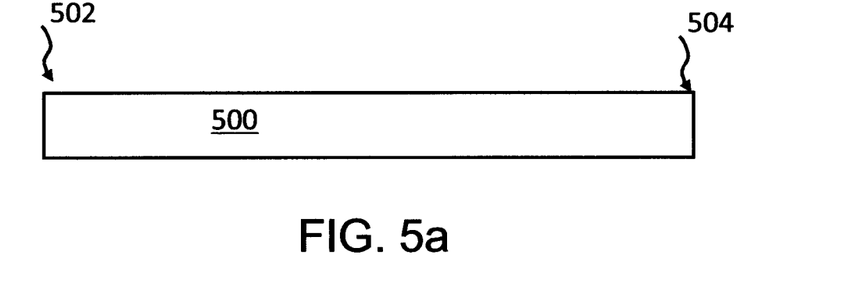
Figure 5B:
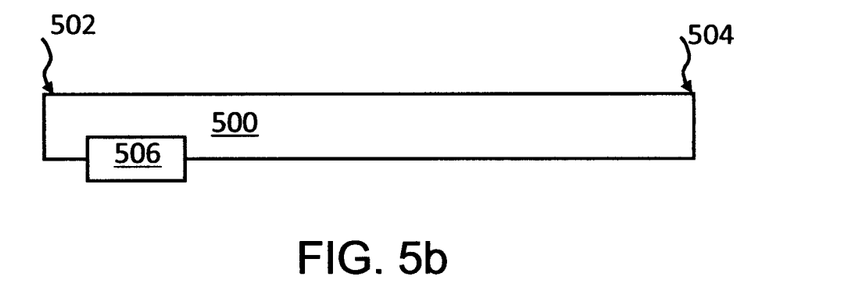
Figure 5C:
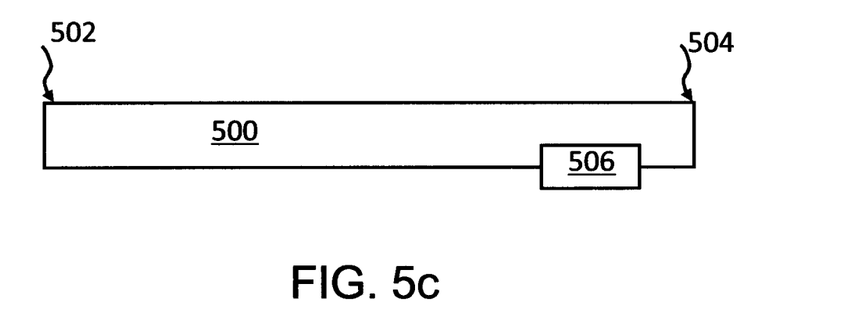

FIGS. 5a to 5c illustrate a preference setting for user interests. User interests of a selected profile may be represented as keywords on a surface, e.g., on a bar 500, shaded in from one color to another, e.g., red to blue as illustrated in FIG. 5a. Reference numeral 502 may represent the blue end of the bar 500 and reference numeral 504 may represent a red end of the bar 500. The color scheme may be chosen according to the "hot-and-cold" metaphor, where hot, represented by red color, may denote interest and cold, represented by blue color, may denote no interest. The colors between red and blue may denote any degree of partial interest. Any other color scheme may be used.

FIG. 5b shows a keyword 506 hovered over the cold end of the bar 500. FIG. 5c shows a keyword 506 hovered over the hot end of the bar 500. Using this sliding technique, a user may be enabled to easily assign interest levels to the user model in an effective way.

It may be interpreted as that the more red a keyword or item location may be, the higher the interest it may represent to the user. A font size of items/keywords may denote the term frequency in the user browsing log, which may mean that the keywords that the user encounters often (e.g., in the text of read documents) may appear bigger and/or in another font in relation to those he/she may read less often about.

Finally, the keywords may be organized into groups according to their type, e.g., people, companies, locations, and so on. The user may be enabled to zoom in/out the entire collection of interests. By zooming in, the user may get a detailed view of terms in a certain area, and by zooming out, he/she may switch back to the overview of the entire interest profile. In an enlarged view, the user may navigate through the collection of terms by dragging the surface in a respective direction. The user interface may also support a number of filtering options. Interests may be filtered by type and by interest group. For instance, the user may display only companies, people, and countries and/or filter out the terms that he/she may not be interested in.

The user interface may not only indicate that an adaptation has occurred, but may also explain to the user exactly what has been adapted. In addition, it may allow the user to adjust the adaptation by altering the system's information about user interests. In order to change the interest degree in a certain item, the user may simply drag it into the appropriate color zone as explained above. This will have immediate effect on the personalization in the portlet. For instance, the user may like to check the latest news on the financial crisis and its effects in a country, e.g., Germany. Using the interface, the user may simply drag 'financial crisis' and 'Germany' to the red zone 504. This may trigger a respective update in the user model (e.g., the terms may be marked as highly interesting) and may update the sorting of news in the portlet, i.e., promote the relevant stories to higher positions. Also, through the interface, the user may insert new interests into his/her interest profile using two options. Firstly, the user may select any fragment in the content of the portlet and drag it into the appropriate place in the user model. Secondly, the user may double click into the place where he/she wants to add new interest and then type it in, for example, through an autocomplete combo-box. The interface may also support deleting items from the model.

Selecting and Managing Interest Profiles: Using the interface, the user may define his/her preferences and may organize them into various interest profiles. The list of available interest profiles may be viewed by clicking a hyperlink containing the name of the currently used interest profile. In a list, the user may switch between the user's own interest profiles and the shared profiles (e.g. editor's choice or the most popular stories). The interests of the selected profile may be displayed on the colored bar 500 and used for personalizing the portlet's content.

Selecting Personalization Effects: In a way similar to switching between interest profiles, the user may also switch between personalization effects (e.g., if multiple effects are supported for the portlet). By clicking on, e.g., a hyperlink containing the name of the currently used personalization effect (e.g. the 'sort news' personalization effect) the system may display a list of available personalization effects, in which the user may select the preferred effect for personalization. For instance, for a portlet containing a list of news stories, personalization effects may be: (1) sort news—interesting stories may appear on the top; (2) highlight news—interesting stories may be highlighted with color; (3) scale news—interesting stories may appear bigger in relation to less interesting ones.

Personalization of Individual Portlets: The approach of this invention may enable a fine-grained personalization of individual portlets independently from each other. The user may be enabled to set multiple interest profiles and may define what profile should be used by what portlets. Depending on the content, the portlet may use different types of terms from the interest profile for achieving different personalization effects.

A portlet named, e.g., 'recommended categories' or 'News—Europe' may use the whole set of user interests from a politics profile for recommending interesting portal categories and sorting news stories, respectively. On the other hand, a portlet named 'Hot Spot Map' may leverage only the interests of type 'country' from the politics profile for representing the hot locations on the map. In a similar way, a 'Photos' portlet may leverage only the interests of type 'person' to display images that might be of some interest to the user. However, if the user may opt for having some of the portlets impersonalized, he/she may either completely turn personalization off, or select one of the shared profiles (e.g., to see the most popular documents or the ones selected by the editor) provided as a predefined profile, or one that may have been aggregated in accordance with the user model using a weighted average of a group of different users. The weighting may be pre-definable.

Figure 6:
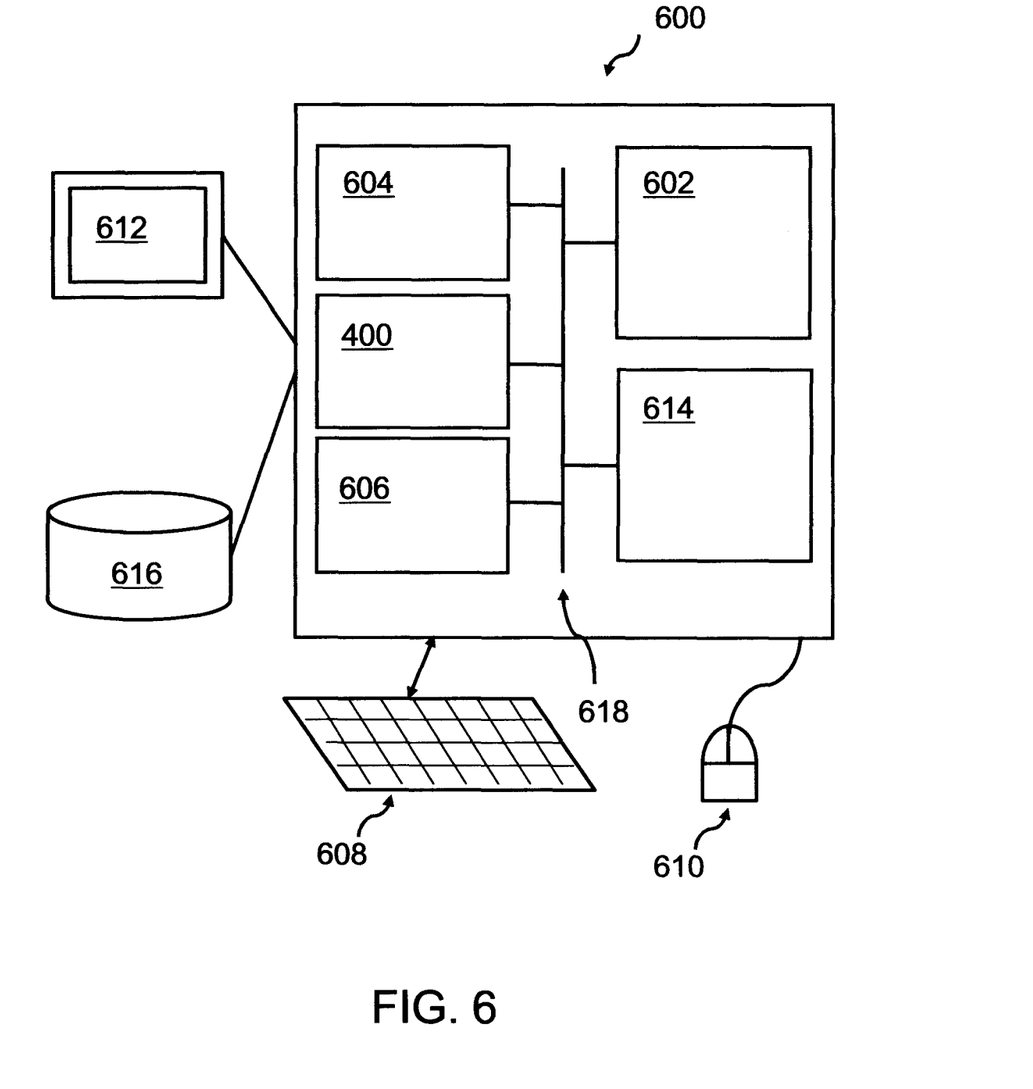
FIG. 6 illustrates a computer system comprising the inventive web content personalization engine.

Embodiments of the invention may partly be implemented on virtually any type of computer, regardless of the platform being used, that is suitable for storing and/or executing program code. For example, as shown in FIG. 6, a computer system 600, which may be equivalent to the above mentioned physical server 202, may include one or more processor(s) 602 with one or more cores per processor, associated memory elements 604, an internal storage device 606 (e.g., a hard disk, an optical drive such as a compact disk drive or digital video disk (DVD) drive, a flash memory stick, etc.), and numerous other elements and functionalities typical of today's computers (not shown). The memory elements 604 may include a main memory, employed during actual execution of the program code, and a cache memory, which provides temporary storage for at least some program code or data in order to reduce the number of times code must be retrieved from external bulk storage 616 for execution. Elements inside the computer 600 may be linked together by means of a bus system 618 with corresponding adapters. Additionally, a web content personalization engine 400 may be attached to the bus system 618. The content personalization engine 400 may, in particular, use a user model, a domain model, and a terms log.

The computer system 600 may also include input means, such as a keyboard 608, a mouse 610, or a microphone (not shown). Furthermore, the computer 600 may include output means, such as a monitor 612—for example, a liquid crystal display (LCD), a plasma display, a light emitting diode display (LED), or a cathode ray tube (CRT) monitor. The computer system 600 may be connected to a network (e.g., a local area network (LAN), a wide area network (WAN), such as the Internet, or any other similar type of network, including wireless networks via a server network adapter 614 and/or storage system 218. This may allow a coupling to other computer systems. Those skilled in the art will appreciate that many different types of computer systems exist, and the aforementioned input and output means may take other forms. Generally speaking, the computer system 600 may include at least the minimal processing and input and/or output means necessary to practice embodiments of the invention.

Further, those skilled in the art will appreciate that one or more elements of the aforementioned computer system 600 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, benefiting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined.

The invention claimed is:

1. A method for enabling a user to adapt personalization of web content, the method comprising:
   accessing web content with a computer;
   selecting components of the web content in accordance with a user model that is automatically generated and stored by a modeling server of the computer, the user model comprising a plurality of keywords and for each keyword, an interest degree associated therewith, the interest degree reflecting a degree of interest of the user in content corresponding to the keyword, whereby the components are selected responsive to the computer determining that associated meta data of the selected components matches one or more of the keywords stored in the user model;
   structuring the selected components of the web content in accordance with the user model, whereby the selected components are organized for presentation according to the interest degree associated with the matched one or more keywords;
   presenting the structured components of the web content in a portlet of a web portal in accordance with the user model as personalized for the user, whereby at least one personalization effect associated with the matched one or more keywords is applied to cause a visual distinction, in the portlet, for at least one of the structured components; and
   providing a graphical user interface in the web portal for the user to adapt the user model in real time, wherein the graphical user interface is provided together with the structured components presented in the portlet of the web portal, wherein the real-time adapting of the user model comprises, for a selected one of the matched keywords, changing the interest degree associated therewith by moving a representation of the selected keyword to a location that represents the changed interest degree on a graphical user interface element and responsive to the changing, reflecting the changed interest degree by updating at least one of the structuring of the selected components and the presenting of the structured components as personalized for the user.

2. The method according to claim 1, further comprising providing a control button for the portlet for selectively enabling or disabling the applying of the at least one personalization effect.

3. The method according to claim 1, wherein:
   the plurality of keywords stored in the user model are organized therein by a plurality of interest profiles of the user, each of the interest profiles having associated therewith one or more of the plurality of keywords;
   the matched one or more keywords are the one or more keywords associated with a currently-active one of the interest profiles; and
   the at least one personalization effect is associated with the currently-active one of the interest profiles.

4. The method according to claim 3, wherein:
   the real-time adapting comprises detecting a selection, by the user, of a different one of the plurality of interest profiles from the user model; and
   the updating comprises updating the ordering of the selected components according to the different one of the interest profiles responsive to changing the interest degree of the selected one of the matched keywords.

5. The method according to claim 1, wherein:
   the graphical user interface element comprises areas displayed using a plurality different colors, the graphical user interface element representing dynamically-selectable interest degrees and the plurality of different colors each corresponding to a particular one of the dynamically-selectable interest degrees;
   the location is displayed using a particular one of the plurality of different colors; and
   the changing comprises changing the interest degree of the selected keyword to the particular one of the dynamically-selectable interest degrees to which the particular one of the plurality of different colors corresponds.

6. A computer system for enabling a user to adapt a personalization of web content, comprising:
   an accessing unit for accessing web content with a computer;
   a selecting unit adapted for selecting components of the web content in accordance with a user model that is automatically generated and stored for the user by a modeling server of the computer, the user model comprising a plurality of keywords and for each keyword, an interest degree associated therewith, the interest degree reflecting a degree of interest of the user in content corresponding to the keyword, whereby the components are selected responsive to the accessing unit determining that associated meta data of the selected components matches one or more of the keywords stored in the user model;
   a structuring unit adapted for structuring the selected components of the web content in accordance with the user model, whereby the selected components are organized for presentation according to the interest degree associated with the matched one or more keywords;
   a presenting unit adapted for presenting the structured components of the web content in a portlet of a web portal, as personalized for the user in accordance with the user model, whereby at least one personalization effect associated with the matched one or more keywords is applied to cause a visual distinction, in the portlet, for at least one of the structured components; and
   a providing unit adapted for providing a graphical user interface in the web portal for the user to adapt the user model in real time, wherein the graphical user interface is provided together with the structured components presented in the portlet of the web portal and displays a plurality of keywords from the user model within a graphic, each of the displayed keywords corresponding to at least one of the selected components, wherein the real-time adapting of the user model comprises, for a selected one of the displayed keywords, detecting that the user moves the displayed keyword from a first position within the graphic to a second position within the graphic, each of the first position and the second position being associated respectively with different first and second interest levels of the user, and responsive to the detecting, changing the presentation of the structured components in the portlet to reflect the second interest level instead of the first interest level.

7. A computer program product, stored on a non-transitory computer-usable medium, comprising computer readable program code which, when executed on a computer, causes the computer to perform:
   accessing web content with a computer;
   selecting components of the web content in accordance with a user model that is automatically generated and stored by a modeling server of the computer, the user model comprising a plurality of keywords and for each keyword, an interest degree associated with the keyword, the interest degree reflecting a degree of interest of the user in content corresponding to the keyword, whereby the components are selected responsive to the computer determining that associated meta data of the selected components matches one or more of the keywords stored in the user model;

structuring the selected components of the web content in accordance with the user model, whereby the selected components are organized for presentation according to the interest degree associated with the matched one or more keywords;

presenting the structured components of the web content in a portlet of a web portal in accordance with the user model as personalized for the user, whereby at least one personalization effect associated with the matched one or more keywords is applied to cause a visual distinction, in the portlet, for at least one of the structured components; and providing a graphical user interface in the web portal for the user to adapt the user model in real time, wherein the graphical user interface is provided together with the structured components presented in the portlet of the web portal, wherein the real-time adapting of the user model comprises, for a selected one of the matched keywords, detecting that the user moves the selected keyword from a first position within the graphic to a second position within the graphic, each of the first position and the second position being associated respectively with different first and second interest levels of the user, and responsive to the detecting, changing the interest degree associated therewith to reflect the second interest level instead of the first interest level and responsive to the changing, reflecting the changed interest degree by updating at least one of the structuring of the selected components and the presenting of the structured components as personalized for the user.

8. The method according to claim 1, wherein the keywords stored in the user model are extracted automatically, by the modeling server for the storing, from content resources requested by the user.

9. The method according to claim 1, wherein the interest degree is computed by the modeling server.

10. The method according to claim 9, wherein the computing comprises calculating a number of times the keyword occurs in a browsing history for the user as compared to a total number of occurrences of all keywords in the browsing history for the user.

11. The method according to claim 3, further comprising providing a control button for the portlet, the control button operative to cause display of the one or more keywords associated with the currently-active one of the interest profiles.

12. The method according to claim 1, wherein the updating comprises:
changing the ordering of the selected components responsive to changing the interest degree of the selected one of the matched keywords.

13. The method according to claim 1, wherein:
the moving comprises the user hovering a pointing device over the location; and
responsive to detecting that the user subsequently clicks the pointing device while hovering the pointing device over the location, storing the changed interest degree in the user model in association with the selected one of the matched keywords.

14. The method according to claim 3, wherein:
the real-time adapting further comprises detecting an action of the user to signal adding a new keyword to the user model, the action occurring at a particular location within the graphical user interface element, wherein:
the graphical user interface element represents dynamically-selectable interest degrees and dynamically-selectable ones of the interest profiles; and
the particular location corresponds to a particular one of the dynamically-selectable interest degrees and a particular one of the dynamically-selectable interest profiles; and
responsive to detecting the action, adding the new keyword to the user model in association with the particular one of the dynamically-selectable interest profiles, the interest degree associated with the added keyword in the user model comprising the particular one of the dynamically-selectable interest degrees.

15. A system for a user to adapt personalization of content, comprising:
a computer comprising a processor; and
instructions which are executable, using the processor, to perform functions comprising:
collecting a browsing history of a user, the browsing history comprising an identification of each of a plurality of resources requested by the user;
programmatically extracting, for the collected browsing history, a plurality of keywords occurring in content of the requested resources, and storing the extracted keywords in a user model for the user;
computing, for each of the plurality of keywords, an associated interest degree reflecting an expected degree of interest of the user in content corresponding to the keyword, and storing the computed interest degree for each of the keywords in association with the each keyword;
providing a personalized content display for the user, comprising:
accessing content of a resource requested by the user;
comparing meta data associated with components of the accessed content to the stored keywords in the user model to determine, for each stored keyword that matches during the comparing, the computed interest degree stored in the user model in association with each matched keyword;
structuring the components of the accessed content for display according to the determined interest degree for the each matched keyword; and
displaying the structured components in a graphical user interface of the computer as the personalized content display; and
providing an interactive interface for the user to perform real-time adaptation of the personalized content display, comprising:
displaying a graphic in the graphical user interface of the computer, the graphic representing dynamically-selectable interest degrees for content;
displaying each matched keyword in the graphic at a position corresponding to the determined interest degree for the each matched keyword;
responsive to detecting a moving, by the user, of a selected one of the displayed matched keywords to a different position in the graphic, restructuring the components for the display to cause at least one of the components to reflect the dynamically-selectable interest degree corresponding to the different position and updating the stored interest degree associated with the selected keyword to reflect the dynamically-selectable interest degree, the at least one of the components comprising any of the components of the accessed content for which the comparing matched the associated meta data to the selected one of the displayed matched keywords; and displaying the restructured components in the graphical user interface of the computer as the personalized content display.

\* \* \* \* \*